(12) United States Patent
Selokar et al.

(10) Patent No.: US 11,838,173 B2
(45) Date of Patent: Dec. 5, 2023

(54) SYSTEM AND A METHOD FOR RECOGNIZING AND ADDRESSING NETWORK ALARMS IN A COMPUTER NETWORK

(71) Applicant: Hewlett Packard Enterprise Development LP, Houston, TX (US)

(72) Inventors: Prashant Baburao Selokar, Pune (IN); Prasanna Hasmukhlal Patil, Bangalore Karnataka (IN); Latha Nayak Karkala, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/823,869

(22) Filed: Aug. 31, 2022

(65) Prior Publication Data

US 2022/0417080 A1 Dec. 29, 2022

Related U.S. Application Data

(63) Continuation of application No. 17/178,908, filed on Feb. 18, 2021, now Pat. No. 11,588,677.

(30) Foreign Application Priority Data

Mar. 2, 2020 (IN) .............................. 202041008880

(51) Int. Cl.
*H04L 41/0631* (2022.01)
(52) U.S. Cl.
CPC ................................ *H04L 41/0631* (2013.01)
(58) Field of Classification Search
CPC .................................................. H04L 41/0631

USPC ......................................................... 709/224
See application file for complete search history.

(56) References Cited

U.S. PATENT DOCUMENTS

| | | | |
|---|---|---|---|
| 8,352,592 B2* | 1/2013 | Van Horne | H04L 41/0631 |
| | | | 714/48 |
| 8,479,289 B1 | 7/2013 | Krishnappa | |
| 8,854,202 B2 | 10/2014 | Anderson et al. | |
| 9,019,095 B2 | 4/2015 | Sykes et al. | |
| 9,219,639 B2* | 12/2015 | Jain | G06F 11/3409 |
| 9,413,597 B2 | 8/2016 | Damle et al. | |
| 9,571,334 B2* | 2/2017 | Wessels | H04L 43/045 |

(Continued)

OTHER PUBLICATIONS

Post, D.L., "Network Management: Assessing Internet Network-Element Fault Status Using Neural Networks", Nov. 2008, 120 Pgs.

*Primary Examiner* — David P Zarka
(74) *Attorney, Agent, or Firm* — Hewlett Packard Enterprise Patent Department

(57) ABSTRACT

The present invention relates a system and a method of recognizing and addressing network alarms in a computer network. A network adapter is configured to receive network alarms related to operating condition of network devices present in the computer network, wherein the network devices are managed by different vendors. Information present in the network alarms is analyzed to determine elements indicating the operating condition of the network devices. The elements may comprise at least one of keywords, object identifiers, and values of the object identifiers. A trained data model is finally used for mapping the network alarms with standard attributes. Based on such mappings, the network alarms are then addressed.

15 Claims, 6 Drawing Sheets

(56) References Cited

U.S. PATENT DOCUMENTS

| | | |
|---|---|---|
| 9,652,972 B1 | 5/2017 | Lushear et al. |
| 10,637,715 B1* | 4/2020 | Vasilyev ............... H04L 41/065 |
| 10,637,737 B2* | 4/2020 | Whitner ................. H04L 67/10 |
| 10,699,556 B1 | 6/2020 | Ganapathi et al. |
| 10,827,318 B2 | 11/2020 | Kang et al. |
| 10,869,100 B2 | 12/2020 | Ward |
| 11,062,240 B2 | 7/2021 | Goyal et al. |
| 2006/0187937 A1* | 8/2006 | Townsley ............ H04L 12/4641 |
| | | 370/469 |
| 2014/0134969 A1 | 5/2014 | Jin et al. |
| 2015/0019913 A1* | 1/2015 | Singh .................... G06F 11/079 |
| | | 714/37 |
| 2017/0310536 A1 | 10/2017 | Bellinger et al. |
| 2018/0150758 A1 | 5/2018 | Niininen et al. |
| 2018/0239658 A1 | 8/2018 | Whitner et al. |
| 2018/0359137 A1* | 12/2018 | Vaderna ............. H04L 41/0631 |
| 2021/0233525 A1 | 7/2021 | Jaiswal et al. |
| 2021/0273843 A1* | 9/2021 | Selokar ............... H04L 41/0631 |

\* cited by examiner

SYSTEM AND A METHOD FOR RECOGNIZING AND ADDRESSING NETWORK ALARMS IN A COMPUTER NETWORK

CROSS REFERENCE TO RELATED APPLICATIONS

This application is a continuation of, and claims the priority benefit of U.S. patent application Ser. No. 17/178,908, filed on Feb. 18, 2021, issued as U.S. Pat. No. 11,588,677, which claims the priority benefit of IN 202041008880, filed on Mar. 2, 2020, the contents of both are incorporated herein by reference in their entirety.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Computer networks often utilize numerous devices such as network switch, router, hub, and power supply for all the devices. For monitoring of proper functioning of one or more functionalities of such devices, specialized network protocols such as Simple Network Management Protocol (SNMP) are generally used. Such protocols are used to maintain continuous communication with all the devices and monitor their status based on the information received from them. The information received from the devices is processed to identify faults associated with the devices, and such faults are accordingly addressed.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

Figure 1:
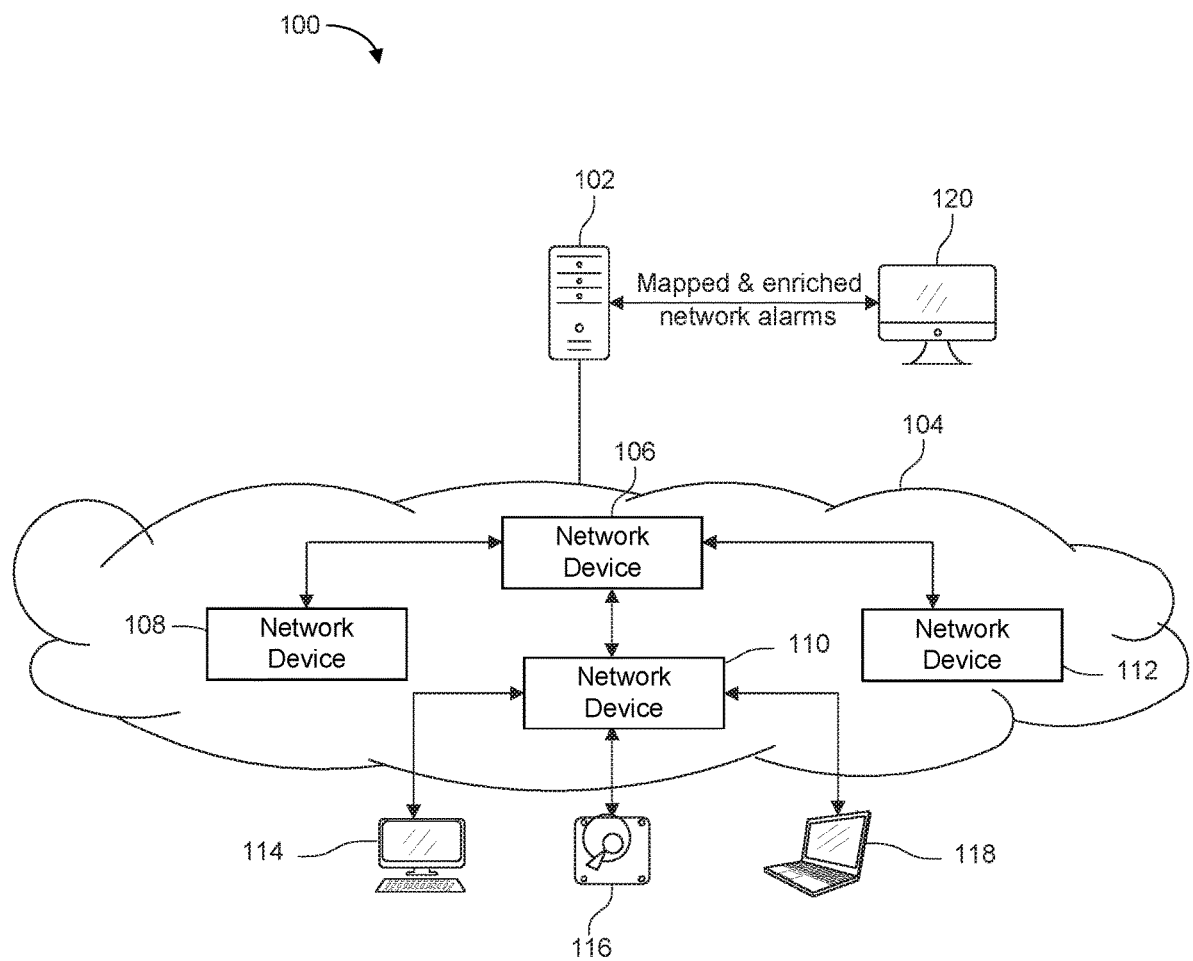
FIG. 1 illustrates a network connection diagram of a system for recognizing and addressing network alarms in a computer network, in accordance with an embodiment of the present invention.

Certain examples have features that are in addition to or in lieu of the features illustrated in the above-referenced figures. Certain labels may be omitted from certain figures for the sake of clarity.

DETAILED DESCRIPTION

Simple Network Management protocol (SNMP) is an application layer protocol used for managing different devices present in a computer network. "SNMP Trap" is a type of information that is commonly used by devices to indicate faults associated with them. Each Trap includes an indicator (such as unique values or error codes) of a specific fault related to a corresponding device. Details related to such indicator is present in Management Information Bases (MIBs) related to the corresponding device. Therefore, in order to understand complete details related to a fault, identifiers carried by the Traps are first extracted, and then details related to such identifiers is looked in corresponding MIBs. A person having technical expertise in understanding the Traps is often required to refer to such MIBs to understand meaning of the identifiers carried by the fault and report such fault, i.e. network alarm, and to manually assign attributes to the network alarm. The network alarm is then addressed based on assigned attributes.

The MIBs related to corresponding devices are different for each devices. Further, the MIBs may also differ for similar devices provided by different vendors. For example, an MIB for a first router belonging to one vendor would be different from an MIB for a second router belonging to another vendor, while the second router has a similar capability and functioning as the first router. Therefore, in practice, the number of MIBs increase to a large number when multiple devices are present in a computer network, and especially when the devices belong to multiple vendors. Referring to such large number of MIBs to understand the faults associated with the devices becomes a tedious task which is currently performed by a person having relevant technical expertise. In this manner, a lot of time gets involved in understanding the faults, and sometimes, the faults may be understood wrongly as a result of human error.

A conventional process of mapping and handling network alarms is now described. At first, network alarms may be received and analyzed. In one instance, a network alarm "linkdown" may be received. Details associated with the network alarm "linkDown" may be analyzed to identify corresponding alarm Object Identifier (OID), VarBind names, and VarBind OIDs. VarBinds or "Variable Bindings" indicate alert data included in a network alarm. Such data is encrypted and is contained in a typical key-value pair configuration.

Successively, attributes related to the network alarms may be categorized and configured. For different VarBinds of the network alarm "linkDown," attributes such as specific problem, severity/priority, probable cause, unique identifier, and enumeration are tagged. Values or details of these attributes are required to be mapped by referring to a relevant description of the VarBinds present in respective MIB s. A person having relevant technical expertise is required to perform the task of collecting values related to the VarBinds, referring to description of the VarBinds, and accordingly populate details related to the attributes.

Post configuring the network alarms, enumeration (ENUM) values are mapped with the network alarms. For different VarBinds, alarm values and ENUM description of the alarm values are populated. Based on the alarm values, priority and severity are assigned to the VarBinds. Different enumeration values may indicate different status of the network alarm enumeration, for example value '1' may indicate critical, '3' may indicate minor, '4' may indicate information, and '6' may indicate clear.

Finally, clearance levels may be mapped to the network alarms. For the network alarm "linkDown", a clearance of "linkup" may be assigned. Based on such clearance level assigned to the network alarms, a technician will be assigned to address the network alarms, for example the network alarm "linkDown" in current case.

A conventional process of enrichment of a network alarm is now described. Enrichment of an alarm indicates presenting the alarm in a desired format having required details. Initially, a network alarm is received in a raw format. For a network alarm "linkDown", date and time of occurrence, source, version of SNMP protocol, and several VarBinds along with OIDs and their values are received. Configuration of the network alarm is checked within a network adapter. The network adapter is configured to receive and store the network alarm in a suitable format. Thereupon, the network alarm is enriched so that an end user can understand the information conveyed by the network alarm. Several details such as a host name, source IP address, date, alarm name, alarm type, specific problem, severity, priority, probable cause, unique alarm identifier, alarm clearance, and service impact are mapped based on the information present in the VarBinds. Thus, to provide the necessary details to an end user in an understandable format for addressing the network faults, a detailed understanding of different network domains, alarms objects and parameters is required. Therefore, the process of providing mapping of network alarms in a user understandable format is not only a complicated task but also requires significant efforts.

To address such challenge, current invention provides a system and method for recognizing and addressing network alarms in a computer network. Specifically, a trained data model is used to recognize and address the network alarms arising in the computer network. The trained data model are developed by learning upon multiple network alarms, from multiple devices of multiple vendors, indicating operating conditions of different network devices, and attributes pre-identified to be associated with each of the multiple network alarms.

Initially, a network adapter is configured to receive network alarms related to an operating condition of a network device present in the computer network. Thereupon, information present in the network alarm is analyzed to determine elements indicating the operating condition of the network device. The elements indicating the operating condition of the network device may comprise keywords, object identifiers, and values of the object identifiers. Finally, the trained data model is used to analyze and map the network alarm with standard attributes. The network alarm mapped with the standard attribute conveys a network fault that can be easily understood, and thereupon rectified.

Referring to FIG. 1, a network connection diagram 100 of a system 102 for recognizing and addressing network alarms in a computer network 104 is explained. The computer network 104 includes network devices such as a network switch 106, a first router 108, a second router 110, and a third router 112. Such network devices 106, 108, 110, and 112 may belong to different vendors and may be configured to transmit network alarms in different formats. The system 102 is connected with the communication network 104 to process network alarms received from the network devices 106, 108, 110, and 112 present in the communication network 104. Although the system 102 is illustrated to be a separate hardware entity connected to the communication network 104, it is possible to implement functionality of the system 102 in one or more routers or switches present in the computer network 104.

The second router 110 is illustrated to be connected with multiple end devices i.e. a desktop computer 114, a Hard Disk Drive (HDD) 116, and a laptop 118. A limited number of network devices and a limited number of end devices are shown to be present in the communication network 104 merely for ease of illustration; however, numerous network devices and end devices would generally be involved in any communication network. The system 102 upon processing the network alarms received from the computer network 104, may provide mapped and enriched network alarms to a display device 120 present at a Network Operation Center (NOC). A manner of processing the network alarms to produce the mapped and enriched network alarms is described in detail in successive paragraphs.

Figure 2:
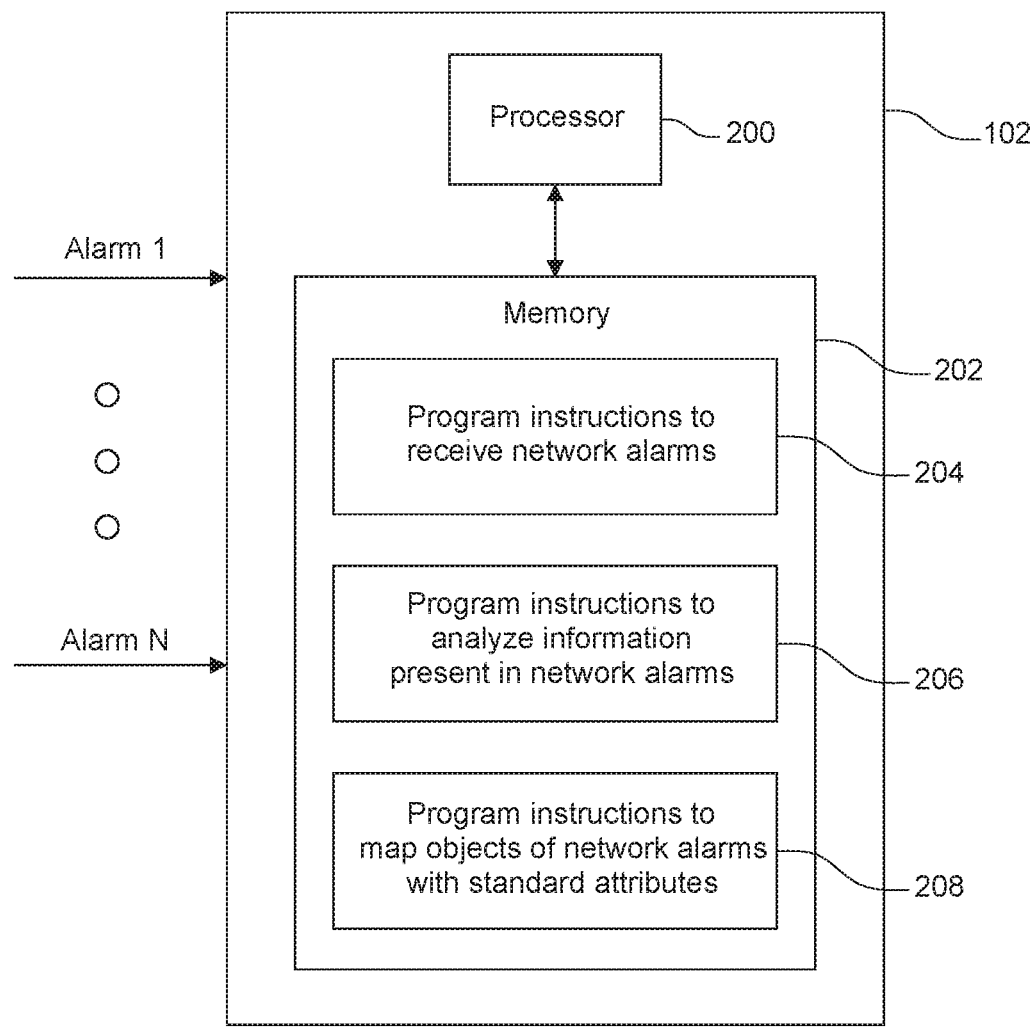
FIG. 2 illustrates a block diagram showing different components of a system for recognizing and addressing network alarms in a computer network, in accordance with an embodiment of the present invention.

FIG. 2 illustrates a block diagram showing different components of the system 102 for recognizing and addressing network alarms in the computer network 104. The system 102 may comprise a processor 200 and a memory 202. The memory 204 may store program instructions for performing several functions through which network alarms could be recognized and addressed in the computer network 104. A few such program instructions stored in the memory 202 includes program instruction to receive network alarms 204, program instructions to analyze information present in network alarms 206, and program instructions to map objects of network alarms with standard attributes 208. The system 102 may receive several network alarms i.e. alarms 1, alarm 2, alarm 3 . . . alarm N from the network devices 106, 108, 110, and 112, and may process such network alarms using the program instructions 204, 206, and 208.

The program instructions to receive network alarms 204 may cause the processor 200 to receive network alarms, such as Simple Network Management Protocol (SNMP) alarms, from different network devices managed by different vendors. The network alarms may indicate operating conditions of the network devices. The operating condition, for example, may refer to connectivity with other devices, bandwidth available for communication, or temperature of device. The program instructions to analyze information present in network alarms 206 may cause the processor 200 to analyze information present in network alarms to determine elements indicating the operating condition of the network devices. Generally, the elements include keywords, object identifiers, and values of the object identifiers.

The program instructions to map objects of network alarms with standard attributes 208 may cause the processor 200 to map objects included in the network alarms with standard attributes using a trained data model. The trained data model may be developed by learning upon several network alarms indicating operating conditions of several network devices and attributes pre-identified to be associated with each of the several network alarms. When employed on a network alarm, the trained data model may map objects of the network alarm into at least one standard attribute. In case a relevant attribute is not identified to be present already, a new attribute corresponding to the network alarm may be created. Detailed functioning of the program instructions 204, 206, and 208 will become evident upon reading the details provided successively.

Figure 3:
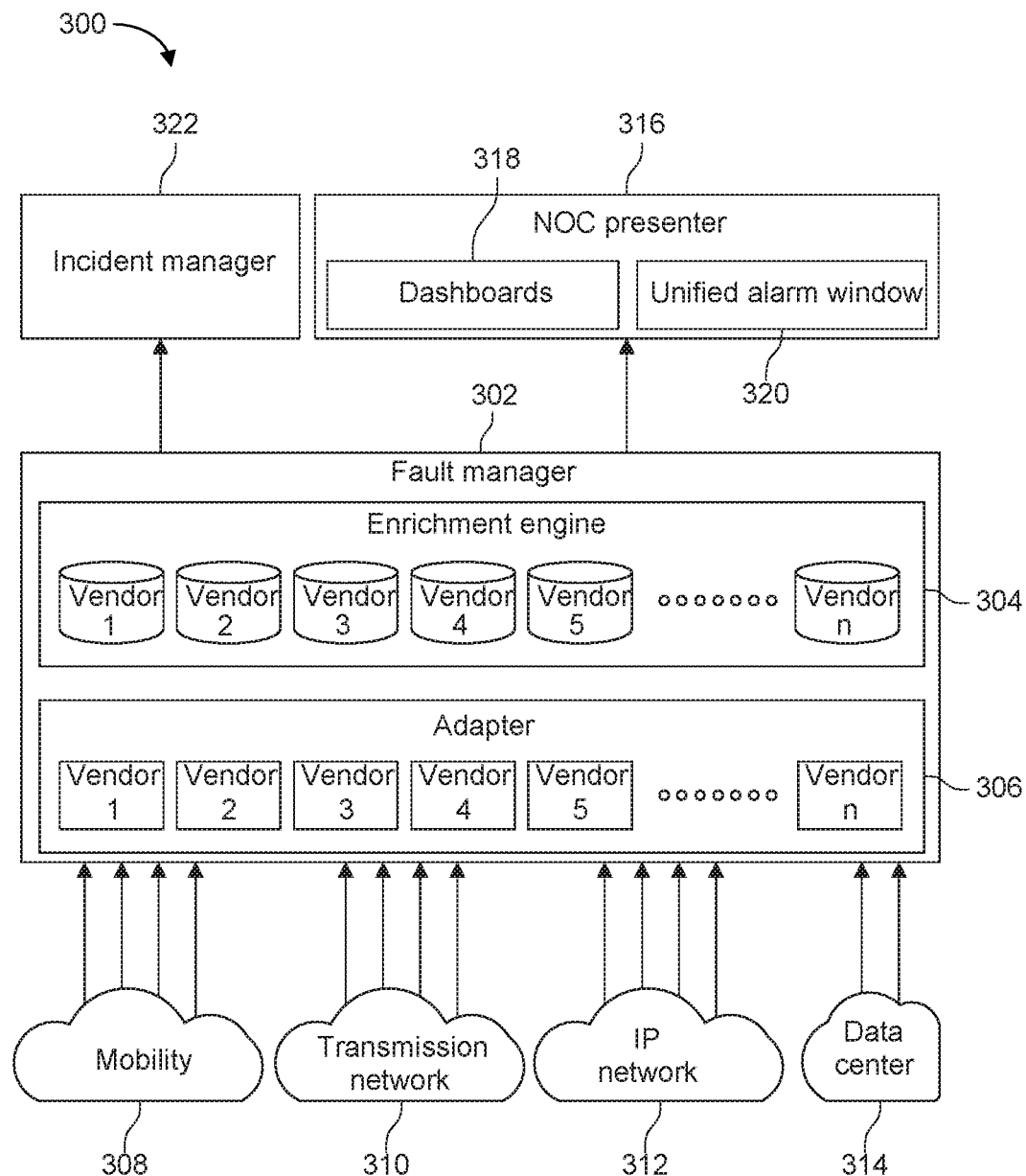
FIG. 3 illustrates an exemplary layered architectural diagram of a system for recognizing and addressing network alarms in a computer network, in accordance with an embodiment of the present invention.

FIG. 3 illustrates an exemplary layered architectural diagram 300 of the system 102 for recognizing and addressing network alarms in the computer network 104, in accordance with an embodiment of the present invention. The layered architectural diagram 300 illustrates a fault manager 302 comprising an enrichment engine 304 and a network adapter 306. The network adapter 306 may be configured to receive network alarms from different networks such as mobility (2G/3G/4G/5G) network 308, transmission network 310, Internet Protocol (IP) network 312, and data center 314. Further, the network adapter 306 may be configured to receive the network alarms from multiple network device types belonging to multiple vendors, namely vendor 1 through vendor n.

In an exemplary embodiment, a data model stored in the network adapter 306 may analyze information present in the network alarms with reference to Management Information Bases (MIBs) related to the network alarms. The data model may be developed using suitable machine learning techniques, to learn upon a plurality of network alarms indicating operating conditions of a plurality of network devices and attributes pre-identified to be associated with each of the plurality of network alarms. Upon analysis, the network adapter 306 may map various objects of the network alarms with standard user understandable attributes, such as specific problem, severity, probable cause, and unique alarm identifier. The data model present in the network adapter 306 may also create mapping of enumeration value for specified objects as per MIBs, generates alarm priority mapping and may generate alarm clearance mapping, based on information specified in MIB s. The network adapter 306 may then feed the enrichment engine 304 with the mapping of enumerated values of objects, priority mapping for values received in alarm, and alarm clearance mapping.

The enrichment engine 304 leverages mapping of enumerated values, priority and clearance received from the network adapter 306. The enrichment engine 304 translates/replaces the appropriate values received in the network alarm with corresponding mapping values. The network alarms mapped with corresponding attributes and enriched information is presented to a user at a Network Operation Center (NOC) presenter 316. The NOC presenter 316 displays such information in a real time on dashboards 318. Further, the NOC presenter provides a unified view of the network alarms mapped with corresponding attributes on a unified alarm window 320. Such information may also be forwarded to an incident manager 322 for raising tickets for field engineers to address the network alarms.

Figure 4:
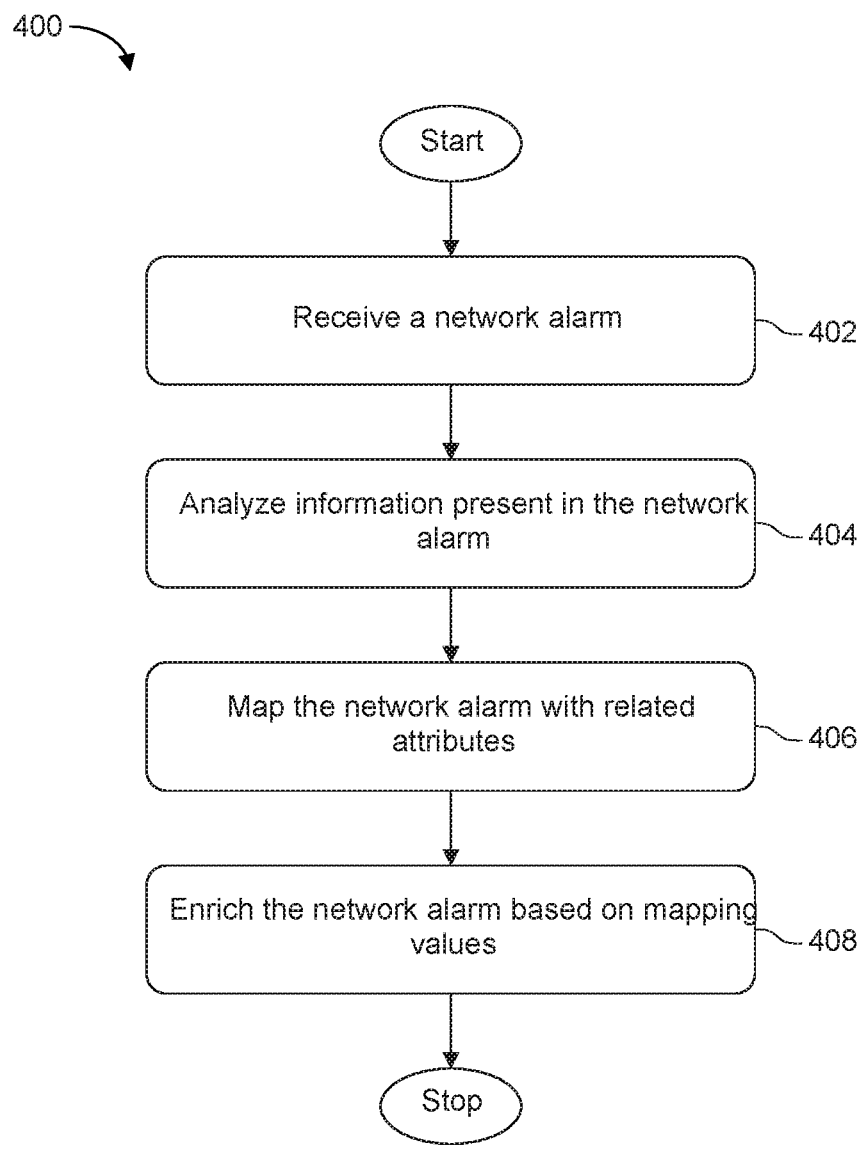
FIG. 4 illustrates a method for recognizing and addressing network alarms in a computer network, in accordance with an embodiment of the present invention.

Referring now to the flowchart 400 of FIG. 4, a method of recognizing and addressing network alarms in the computer network 104 is now described. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 4 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 402, a network alarm, such as a Simple Network Management Protocol (SNMP) alarm, indicating an operating condition of a network device is collected. In an exemplary scenario, the network alarm may be received from the second router 110. The operating condition, for example, may refer to connectivity with other network devices, bandwidth available for communication, or a temperature of the network device. In one scenario, the network alarm may be received by the network adapter 306, configured to communicate with the network devices 106, 108, 110, and 112 present in the computer network 104.

Successively, information present in the network alarm is analyzed, at block 404. Upon performing analysis of the network alarm, elements indicating the operating condition of the second router 110 are determined. Generally, the elements include keywords, object identifiers, and values of the object identifiers.

At block 406, a trained data model is employed on the network alarm to map objects present in the network alarm with relevant attributes that could be understood by a user. The trained data model may be developed by learning upon several network alarms indicating operating conditions of several network devices and attributes pre-identified to be associated with each of the several network alarms. The attributes may be pre-identified to be associated with each of the several network alarms based on definitions of the elements stored in Management Information Bases (MIBs) corresponding to the several network devices. In this manner, domain knowledge, alarm classification, and mapping approach utilized in previous instances may be used in developing the trained data model.

When employed on the network alarm, the trained data model may map the network alarm into at least one existing attribute. The existing attributes may include, for example, Specific Problem, Severity, Priority, Unique Identifier, Probable Cause, Enumeration value, and Clearance. In case a relevant attribute is not identified to be present already, a new attribute corresponding to the network alarm may be created.

At block 408, the network alarm may be enriched, using mapping of enumerated values, priority, and clearance values. Appropriate values received in the network alarm may be translated/replaced with corresponding mapping values. The network alarm mapped with standard attributes and enriched information may be presented at a Network Operation Center (NOC) in a format that is easily understood by a field engineer. In this manner, the field engineer can understand the details associated with the network alarm and then address the network alarm accordingly.

Figure 5A:
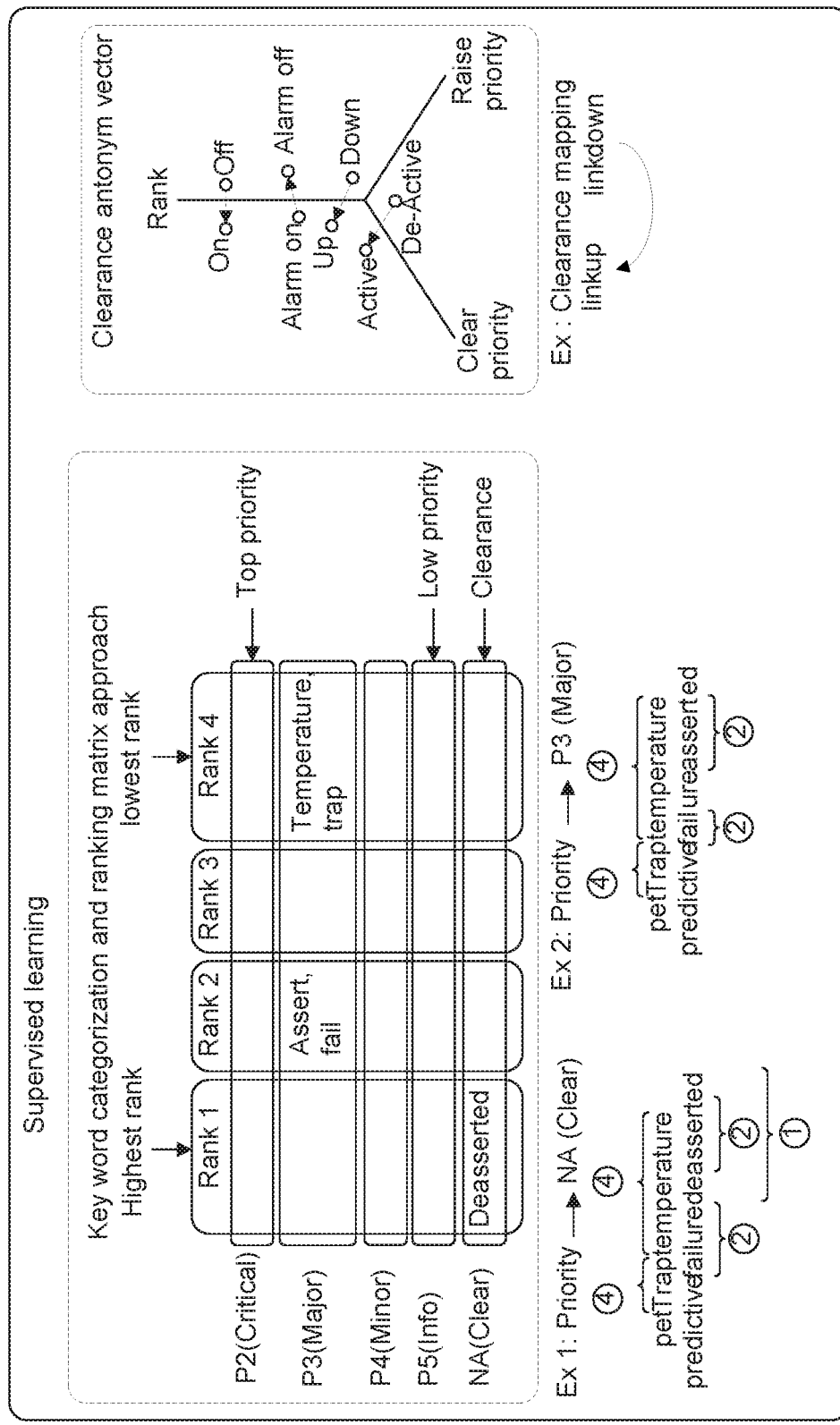
FIG. 5a illustrates exemplary instances related to supervised learning technique used by the trained data model, in accordance with an embodiment of the present invention.

FIG. 5a illustrates exemplary instances related to supervised learning technique used by the trained data model. In one case, a network alarm titled as "petTrapTemperaturePredictiveFailureDeasserted" may be received. Keywords present in name of the network alarm may be identified as Trap, Temperature, fail, and Deasserted. Such keywords may be searched in a predefined priority matrix bag of words, and may be ranked based on the classified keywords. Rank of all these keywords may be identified and a highest rank may be selected. Finally, priority of a keyword having a highest rank may be used for assigning priority to the network alarm. In current case, priority of the network alarm may be identified as 'NA' Clear based on the priority of the keyword "Deasserted" having the highest rank.

In another case, a network alarm titled as "petTrapTemperaturePredictiveFailureAsserted" may be received. Keywords present in name of the network alarm may be identified as Trap, Temperature, Fail, and Assert. Rank of all these keywords may be identified and a highest rank may be selected. Finally, priority of a keyword having a highest rank may be used for assigning priority to the network alarm. In current case, priority of the network alarm may be identified as 'P3' Major based on the priority of the keyword "Asserted" having the highest rank.

As further illustrated in FIG. 5a, for clearance mapping 'Clearance Antonym Vector' may be used. In such case, an alarm clearance bag of words may be maintained on one side, and raise alarm bag of words may be maintained on another side. For clearance mapping, vector relationship may be established between the alarm clearance bag of words and the raise alarm bag of words. For example, a vector relationship may be established between the keywords "Active" and "DeActive". Further, ENUM values defining priority of a network alarm may also be used for the clearance mapping.

Figure 5B:
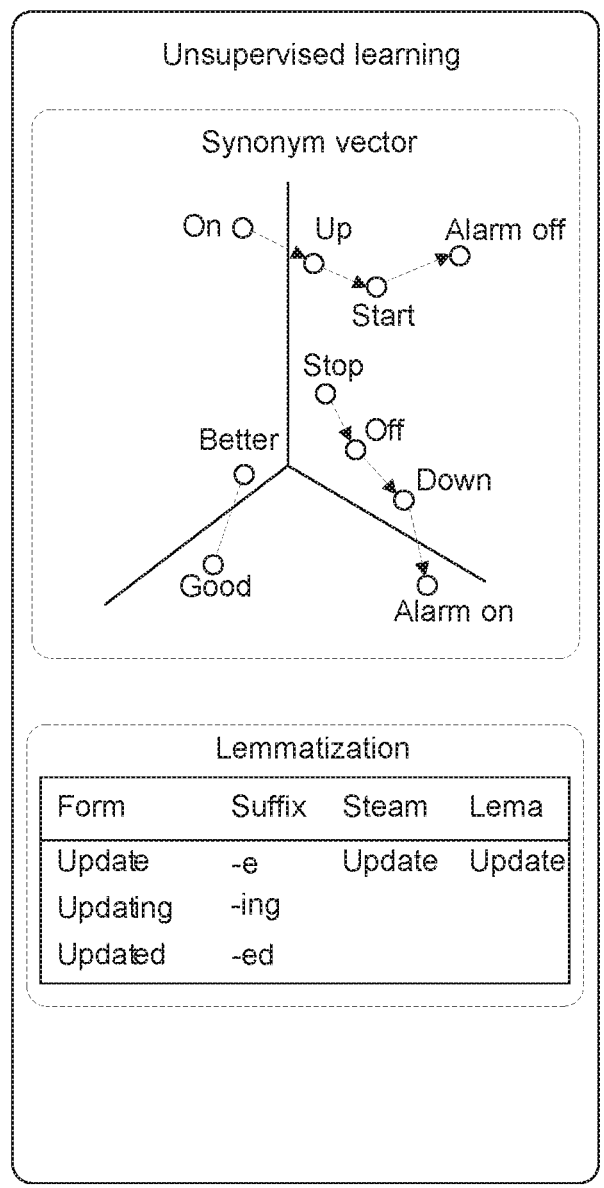
FIG. 5b illustrates exemplary instances related to unsupervised learning technique used by the trained data model, in accordance with an embodiment of the present invention.

FIG. 5b illustrates exemplary instances related to unsupervised learning technique used by the trained data model. In one implementation, synonym vector may be utilized by the unsupervised learning technique. Synonyms may be identified for new keywords identified to be associated with the network alarms. For example, as illustrated in FIG. 5b, a keyword "good" may be identified as a synonym of a keyword "better". Such newly identified keywords may be added to a bag of words referenced by the trained data model. In certain cases, lemmatization technique may be used to establish relationship with new keywords and define rank for the new keywords.

In one exemplary implementation, a trained data model was developed by learning 800 keywords, 120000 known attributes, and 15000 known network alarm types, belonging to 60 different vendors. Upon implementation of the trained data model on a computer network for identifying network alarms, following accuracy was achieved in mapping of network alarms with the attributes.

| S.No. | Attribute | Accuracy |
|---|---|---|
| 1. | Specific Problem | 99% |
| 2. | Severity | 98.4% |
| 3. | Priority | 90.4% |
| 4. | Probable Cause | 99.8% |
| 5. | Unique Identifier | 97.4% |
| 6. | Clearance | 90.5% |

The invention as described above using exemplary embodiments has the technical advantage of enabling recognition of network alarms, mapping the network alarms with attributes, and addressing the network alarms using a trained data model.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

A communication network may be a wired and/or a wireless network. The communication network may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Radio waves, and other communication techniques known in the art. The communication network may include mobility (2G/3G/4G/5G) network, transmission network (internet, cordless cables), Radio Access Network (RAN), Internet Protocol (IP) networks such as packet switched and circuit switched networks, and data center infrastructure.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is not limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
    receiving, using a network adapter, a first network alarm related to a first network device of a plurality of network devices present in a computer network;
    in response to a second network alarm being received relating to a second network device of the plurality of network devices present in the computer network, successively providing the first network alarm and the second network alarm to a trained data model,
    wherein the trained data model maps a shared attribute of the first network alarm and the second network alarm to an existing attribute,
    wherein the existing attribute comprises a specific problem, severity, priority, or probable cause related to the first network alarm and the second network alarm,
    wherein the existing attribute is pre-identified to be associated with the first network alarm and the second network alarm based on a definition of an element indicating an operating condition of each of the plurality of network devices, and wherein the definition of the element is stored in Management Information Bases (MIBs) corresponding to the plurality of network devices, and
    wherein the trained data model maps the existing attribute to a shared enumerated value, priority, or clearance value;
    replacing, using the network adapter, a value in the first network alarm and the second network alarm with the shared enumerated value, priority, or clearance value; and
    presenting at a display, using the network adapter, the shared enumerated value, priority, or clearance value.

2. The method as claimed in claim 1, wherein the plurality of network devices belong to different vendors and have different alarm formats.

3. The method as claimed in claim 1, wherein the existing attribute is pre-identified to be associated with the first network alarm and the second network alarm based on a definition of an element indicating an operating condition of each of the plurality of network devices, and wherein the definition of the element is stored in Management Information Bases (MIBs) corresponding to the plurality of network devices.

4. The method as claimed in claim 1, further comprising creating a new attribute corresponding to a network alarm in response to a relevant attribute not existing.

5. The method as claimed in claim 1, wherein the first network alarm and the second network alarm are formatted in accordance with a Simple Network Management Protocol (SNMP) from the plurality of network devices, and wherein the plurality of network devices belong to different vendors.

6. The method as claimed in claim 1, wherein the first network alarm and the second network alarm correspond with linkDown network alarms that correspond with an object identifier (OID), VarBind names, and VarBind OID.

7. The method as claimed in claim 1, further comprising:
    prior to presenting the shared enumerated value, priority, or clearance value at the display, ranking a plurality of keywords present in the first network alarm and the second network alarm; and
    assigning a priority to each of the first network alarm and the second network alarm, wherein the priority is used to order information provided at the display.

8. The method as claimed in claim 7, wherein the plurality of keywords comprise at least one of "Trap," "Temperature," "Fail," or "Assert."

9. The method as claimed in claim 1, further comprising:
    implementing post configuring of the first network alarm and the second network alarm based on a corresponding VarBind, wherein the VarBind comprises alert data included in the first network alarm and the second network alarm.

10. The method as claimed in claim 1, further comprising:
    enriching the first network alarm and the second network alarm using one or more clearance values.

11. The method as claimed in claim 1, further comprising:
    enriching the first network alarm and the second network alarm using a host name or source internet protocol (IP) address of the first network device and the second network device, respectively.

12. A system comprising:
    processor; and
    a memory including instructions that, when executed on the processor, cause the system to:
        receive a first network alarm related to an operating condition of a network device of a plurality of network devices present in a computer network;
        when a second network alarm is received relating to a second network device of the plurality of network devices present in the computer network, successively provide the first network alarm and the second network alarm to a trained data model,
        wherein the trained data model maps a shared attribute of the first network alarm and the second network alarm to an existing attribute,
        wherein the existing attribute comprises a specific problem, severity, priority, or probable cause related to the first network alarm and the second network alarm,
        wherein the existing attribute is-pre-identified to be associated with the first network alarm and the second network alarm based on a definition of an element indicating an operating condition of each of the plurality of network devices, and wherein the definition of the element is stored in Management Information Bases (MIBs) corresponding to the plurality of network devices, and
        wherein the trained data model maps the existing attribute to a shared enumerated value, priority, or clearance value;
        replace a value in the first network alarm and the second network alarm with the shared enumerated value, priority, or clearance value; and
        present at a display, using the system, the shared enumerated value, priority, or clearance value.

13. The system as claimed in claim 12, wherein the plurality of network devices belong to different vendors and have different alarm formats.

14. The system as claimed in claim 12, further comprising creating a new attribute corresponding to the first network alarm or the second network alarm when a relevant attribute does not exist.

15. A non-transitory, computer readable medium including instructions that, when executed by processing circuitry, cause a system to:
   receive a first network alarm related to of a first network device of a plurality of network devices present in a computer network;
   when a second network alarm is received relating to a second network device of the plurality of network devices present in the computer network, successively provide the first network alarm and the second network alarm to a trained data model,
   wherein the trained data model maps a shared attribute of the first network alarm and the second network alarm to an existing attribute, wherein the existing attribute comprises a specific problem, severity, priority, or probable cause related to the first network alarm and the second network alarm,
   wherein the existing attribute is-pre-identified to be associated with the first network alarm and the second network alarm based on a definition of an element indicating an operating condition of each of the plurality of network devices, and wherein the definition of the element is stored in Management Information Bases (MIBs) corresponding to the plurality of network devices, and
   wherein the trained data model maps the existing attribute to a shared enumerated value, priority, or clearance value;
   replace a value in the first network alarm and the second network alarm with the shared enumerated value, priority, or clearance value; and
   present at a display the shared enumerated value, priority, or clearance value.

* * * * *